Jan. 19, 1937. J. G. TULLGREN 2,067,956
CUTTING STONE AND THE LIKE
Filed Dec. 30, 1933 5 Sheets-Sheet 2
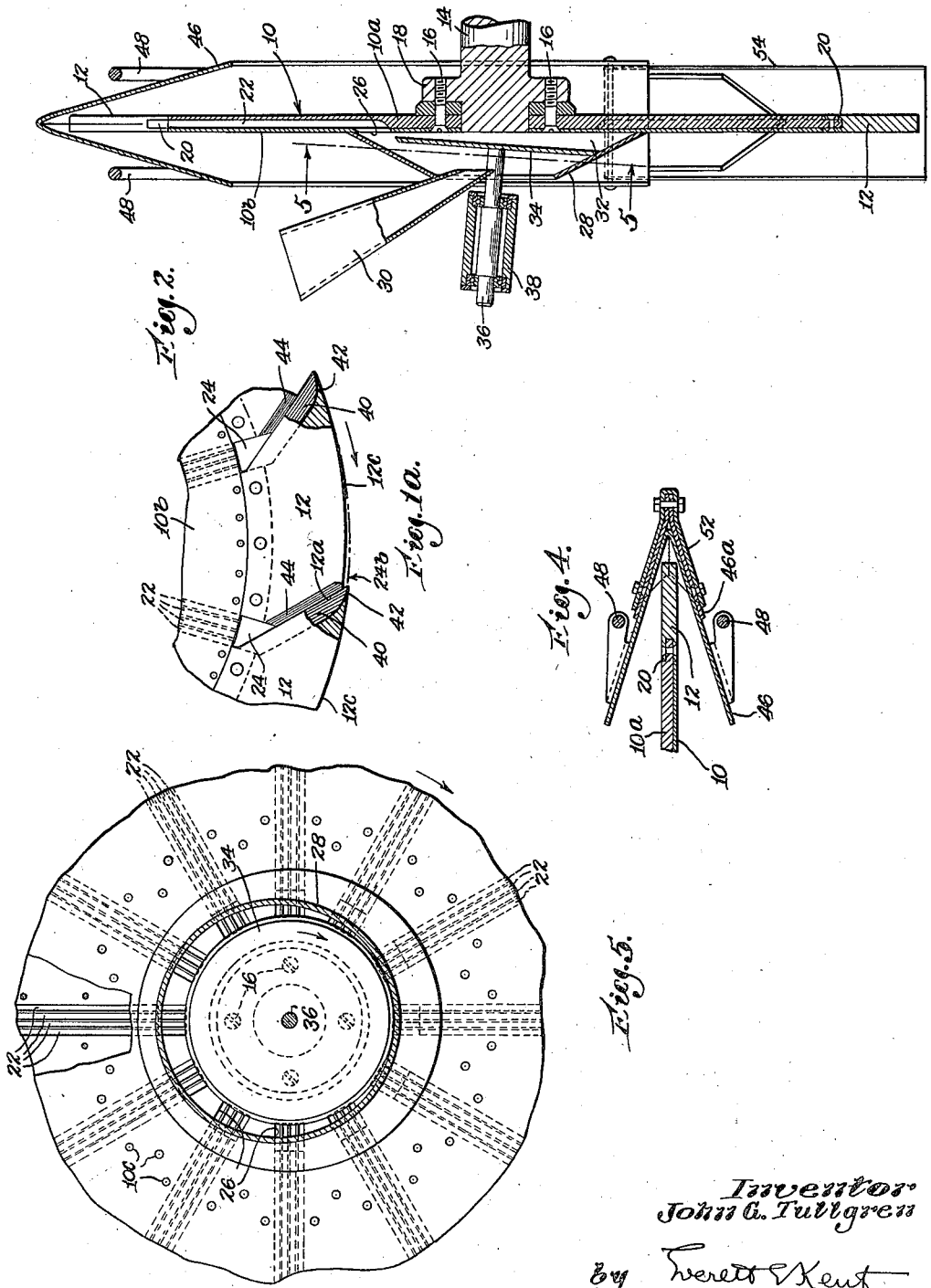

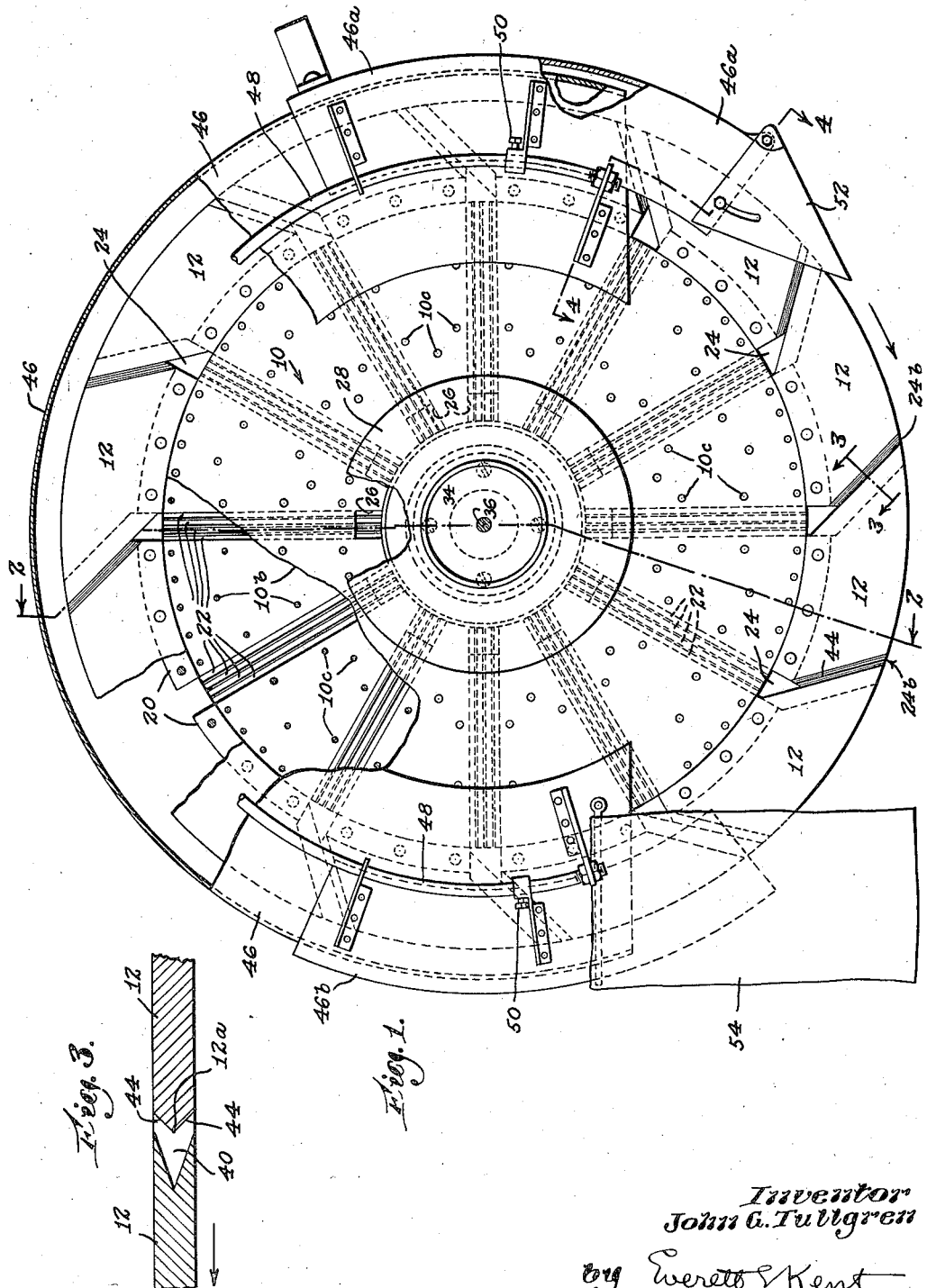

Jan. 19, 1937.   J. G. TULLGREN   2,067,956
CUTTING STONE AND THE LIKE
Filed Dec. 30, 1933   5 Sheets-Sheet 3
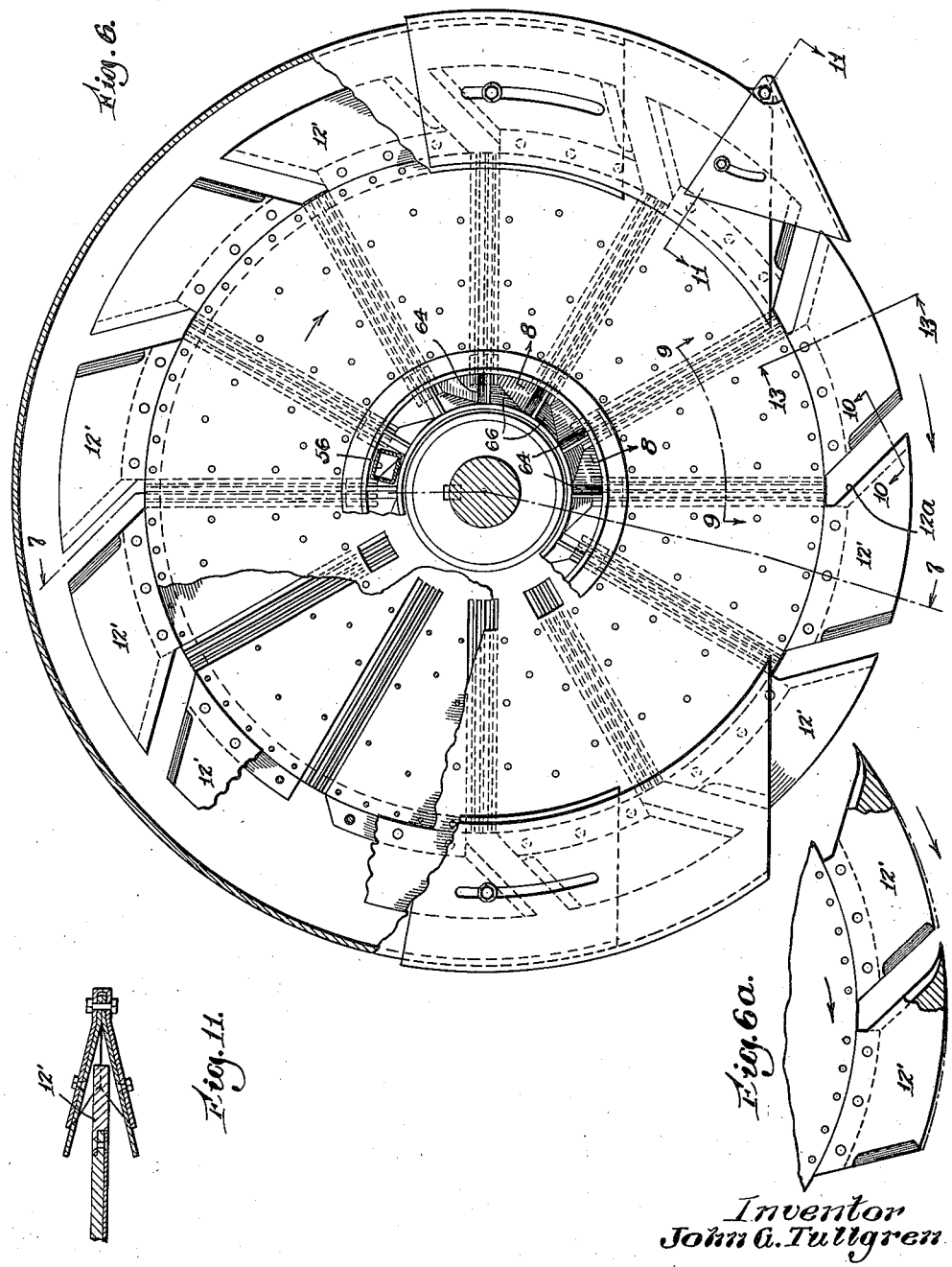
Inventor
John G. Tullgren
by Everett P. Kent
Attorney

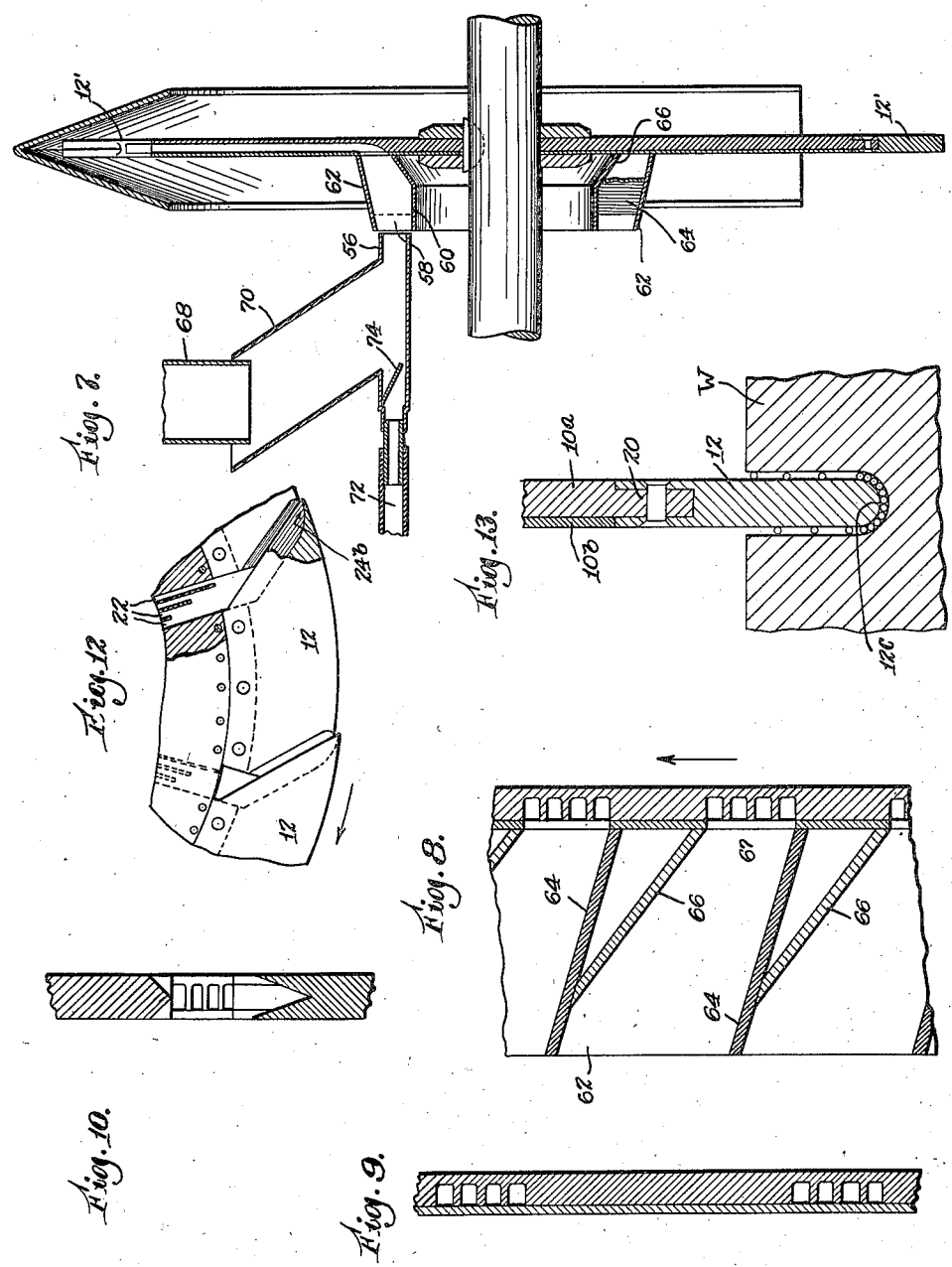

Jan. 19, 1937.  J. G. TULLGREN  2,067,956
CUTTING STONE AND THE LIKE
Filed Dec. 30, 1933  5 Sheets-Sheet 5
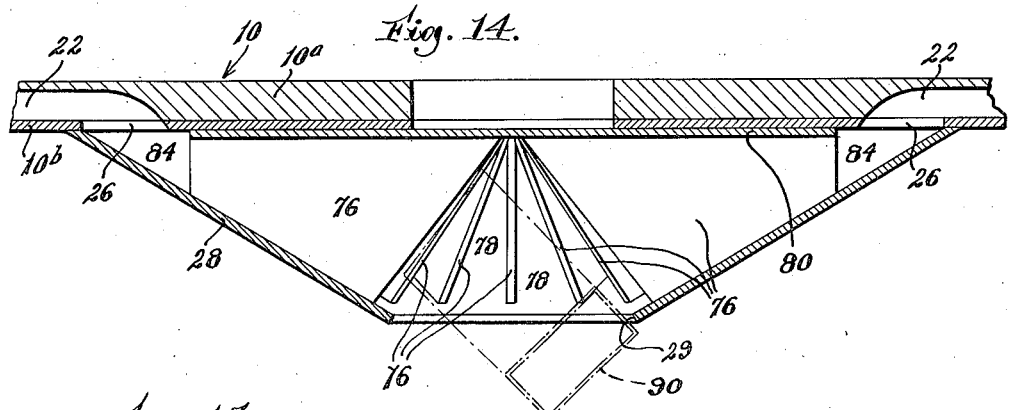
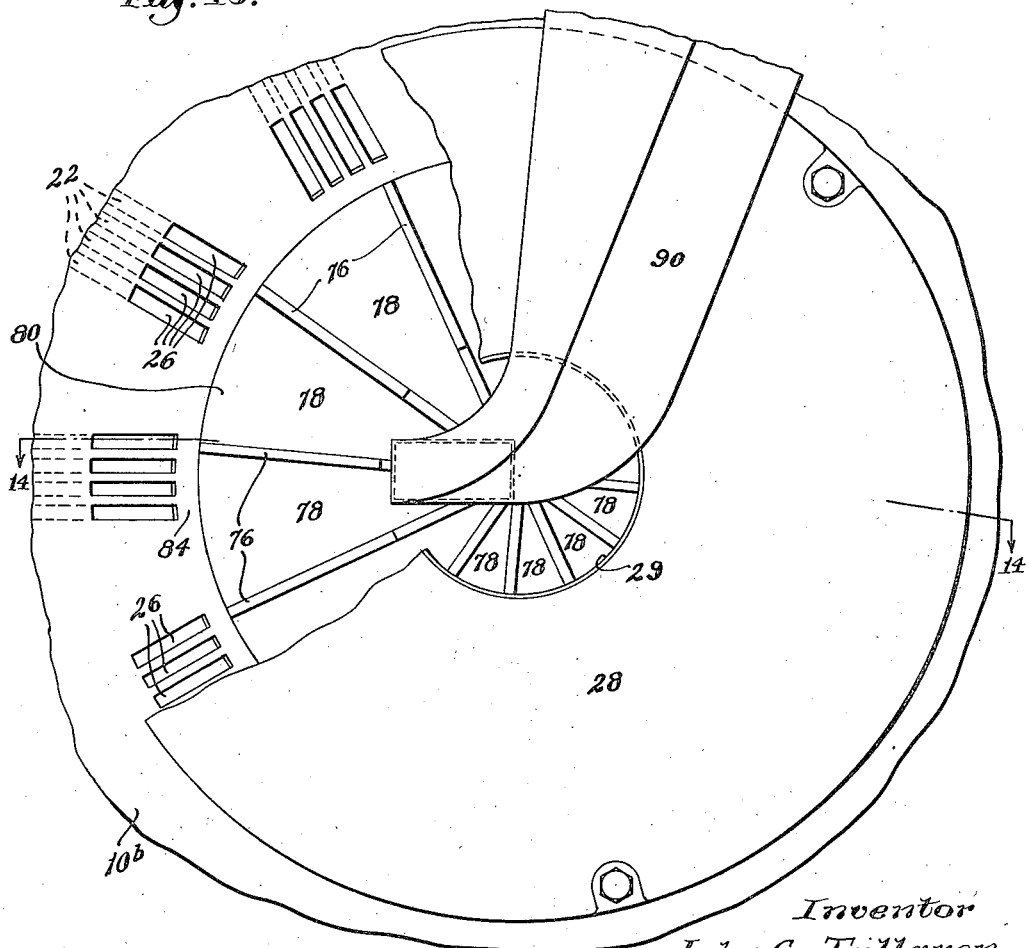
Inventor
John G. Tullgren
by Everett Kent
Attorney Patented Jan. 19, 1937

2,067,956

UNITED STATES PATENT OFFICE 2,067,956

CUTTING STONE AND THE LIKE

John G. Tullgren, Lexington, Mass., assignor of one-half to Enos B. Harrington, Lexington, Mass.; Ella B. Tullgren administratrix of said John G. Tullgren, deceased Application December 30, 1933, Serial No. 704,626

7 Claims. (Cl. 125—12)

This invention relates to improvements in cutting stone and the like.

More particularly it relates to the making of a cut like a saw cut in hard stone, such as granite, by pressure and attrition of a hard granular agent such as chilled iron shot.

Stone cutting of the general class to which the invention belongs is effected by concentrating very heavy pressure upon very small areas of the stone with such intensity that the local surface cracks, the stone being brittle; and the mass of stone undergoes detrition by a wearing away of its surface along the line where the pressure is repeatedly thus concentrated. These concentrations of pressure are effected through the agency of shot, which are rolled along the kerf by the edge of the wheel or other operating blade, between it and the stone. The total pressure of the wheel toward the stone is concentrated at those few and small areas of contact of the stone with the round bodies of the shot.

Although the wheel of the present invention is conveniently spoken of as a "shot wheel", it is observed that any suitable hard granular agent other than shot may be employed as more or less an equivalent, in place of actual "shot", or in addition thereto, without departing from the inventive concept; also that the agent for applying the power compressively is not necessarily a "wheel"; and also that the mention herein of "granite" as its work material is merely illustrative of the utility of the invention for cutting all kinds of hard substances having a nature so brittle as to be capable of being pulverized superficially by the invention described.

Hitherto the shot has been supplied to a shot wheel externally, at the place where the rotating wheel enters the kerf. Such of this shot as gets drawn into the kerf by the wheel performs the function above described. But it is extremely difficult to start a cut into a block of stone. After getting the kerf begun, the wheel draws in only an insufficient number of shot. Also the leading parts of the wheel within the kerf become exhausted of shot. The depth of cut which can be made is thus limited; the progress of the cutting is very slow; the cost is high; and there are other limitations such that the shot wheel system of cutting has not heretofore been commercially satisfactory.

The present invention provides for using shot to cut the stone at a high speed, with a high efficiency, and at a low cost. The improvement in each of these respects is very notable as compared with prior shot wheel methods and apparatus. Also, the new wheel is able to initiate its own kerf at the normal exterior of the block; and it can cut that kerf indefinitely deep, limited only by the size of the wheel.

As compared with carborundum or similar "grinding" wheels which cut by shearing the granite stock, far less power is required. The heat generated is so much less that arrangements for cooling can be omitted.

The invention also provides an important human benefit, by its elimination of an obnoxious dust-laden atmosphere and the serious diseases consequent upon it which hitherto have been the plague of workers and the bane of employers and insurance companies in this industry.

With these various benefits realized, it is believed that the safer and more humane working conditions and the reduced costs of production will be of substantial importance in the granite industry and in other industries to which the invention is applicable.

These and other advantages result from my discovery of a way to effect rapid crumbling of the stone, by operating on all parts of the fresh kerf simultaneously. The blade used is preferably a metal wheel, having suitable hard teeth of tough metal for coacting with the shot and the stone. The shot are managed so that they flow distributively through the wheel to the parts of its periphery which are deep in the kerf and are there applied concentratedly and continuously at the leading face of each tooth. Under pressure the teeth and the shot sweep rapidly and constantly over the head wall of stone in the kerf, cracking off bits of the brittle surface, and clearing out the crumbled detritus.

The continuity of effective feed to each particular tooth while the tooth is embedded in the kerf is attained by the coordinated effect of centrifugal force and of directed or reflected travel of the shot so that they are sprayed backward into the throat between tooth and stone at the leading edge of each oncoming tooth, with the result that the full length of each tooth works all along the fresh kerf with detriting effect.

The shot are introduced at the hub of the wheel; and the parts are so organized and operated that mostly the shot reach the periphery at a tooth, and at a position of that tooth, for their taking part in the cutting. In the wheel illustrated this involves their introduction to the wheel on that side of the axis which is remote from the kerf. Shot which arrive at the periphery too soon, and some of those which arrive too late are collected in a hood which re-supplies them externally to the place where the teeth are entering the kerf, thus supplementing the internal feed.

The wheel may be a composite disk with multiple teeth of such hard and tough material that it is the granite rather than the wheel which breaks away; and the shot should be harder and tougher than the granite. Nevertheless the teeth and the shot will gradually wear away; and the originally circular peripheral extent of each tooth wears into a slightly cam-like form, because of the heavier duty which at first falls upon its leading edge; and this produces a sort of narrow throat for the entrance of the shot to their working positions at the outside of the tooth. The spraying of the fresh supply of shot is directed toward this throat, and the rate of cutting of the granite gradually increases, with the wearing of the wheel teeth, because of the increase of area over which the granite surface is simultaneously being pulverized, and the vigor of the shock with which a shot within such a throat applies its pressure to the granite. As the work to be done is executed by a brittle cracking, rather than by a shearing, rending and tearing, such as a wheel of abrasive type does, the power required and the heat generated are far less than in cutting with a carborundum wheel. The cutting is, in fact, accomplished by the wheel of the present invention many times faster than has been practicably possible heretofore with any type of wheel known to me. Dust is avoided because the moisture which comes with the shot is sufficient to prevent its flying, provided the shot are stored in water, as is convenient to prevent rusting, and are delivered in a wet state into the hub of the wheel,—the temperature in the working region being so low as not to evaporate this moisture.

It will be understood that the pressure is provided by feeding either the shot wheel or the block of stone, the one against the other, apparatus for which is already well known and therefore is not shown in the drawings; nor is it deemed necessary to complicate by representing the means for supporting respectively the stone and the wheel, for which any suitable devices may be used; but those features of novelty which characterize the construction of the wheel, its teeth, the handling of the shot, and their operation upon the stone, are represented in one or more illustrative forms in which they may be applied for successful practice of the invention.

It is intended that the patent shall cover, by suitable expression in the appended claims, whatever features of patentable novelty exist in the invention disclosed.

In the accompanying drawings:

Figure 1 is an elevation of the shot-intake side of a shot wheel and its hood, embodying features of the invention, with portions broken away for clearness, representing a wheel before being used;

Figure 1a is a similar elevation of a fragment of a wheel like that of Figure 1, showing the teeth after a short period of use;

Figure 2 is an edge elevation, in section on 2—2 of Figure 1;

Figure 3 is an edge elevation of a detail, in section on 3—3 of Figure 1, enlarged;

Figure 4 is an edgewise elevation of a detail, in section on 4—4 of Figure 1;

Figure 5 is an elevation, an enlarged detail, in section on 5—5 of Figure 2;

Figure 6 is an elevation, similar to Figure 1, of a modified form of the invention;

Figure 6a is an elevation of a fragment of a wheel like that of Figure 6, showing the teeth after a short period of use;

Figure 7 is an edge elevation, in section on 7—7 of Figure 6;

Figure 8 is an edgewise elevation, enlarged, of a detail, in section on 8—8 of Figure 6;

Figure 9 is an edgewise elevation, enlarged, of a detail, in section on 9—9 of Figure 6;

Figure 10 is an edgewise elevation, enlarged, of a detail, in section on 10—10 of Figure 6;

Figure 11 is an elevation of a detail, in section on 11—11 of Figure 6;

Figure 12 is an elevation of a fragment, with parts in section, of a modified form of feed passages; and Figure 13 is an edge elevation of a fragment of a shot wheel after becoming worn by use, in radial section through a tooth, showing schematically that tooth in a block of stone, with shot represented in cutting relation thereto, and with other shot idling in the cut beside the tooth;

Figure 14 is a plan of the central portion of a wheel, in approximately medial section, on line 14—14 of Figure 15, having a modified form of distributing means for shot to the feed passages; and Figure 15 is an elevation of the structure shown in Figure 14, with a portion of the hub flange broken away for clearness.

In the drawings, Figures 1–5 represent a preferred form in which the feed of shot to the hub is by gravity; Figures 6–8 represent another preferred form in which the feed of shot to the hub is under force of compressed air, and advantage is taken of this set of figures to represent differences in some other respects from the style of Figure 1; and Figures 9–13 represent various details which might be used in either style of wheel.

The preferred form illustrated in Figures 1–5 may comprise a wheel having a body 10, at whose periphery are a multiplicity of teeth 12, which are of thickness equal to that of the body, but are spaced slightly apart in the circumferential direction. The wheel body may be a one-piece disk, but I prefer to make it of two plates, 10a, 10b, secured together, as by the bolts or rivets 10c. The body may be held fast on a drive shaft 14 in any suitable manner, represented in Figure 2 as held by the screws 16 engaging a flange 18 at the end of that shaft. The teeth 12 may be secured in place around the wheel body in any suitable manner, as by tongue-and-groove interengagements as indicated at 20 with bolts or rivets.

Within the wheel body are the enclosed feed passages 22. With the two-plate disk structure, these passages may be formed in the thicker plate 10a as channels over which the plate 10b fits, closing the open sides of the channels. Preferably I arrange the feed passages 22 in groups, with all individuals of a group extending in parallelism from the hub feed chamber 32 to one of the peripheral spaces 24 between the teeth 12. Passages are represented in groups of four, but there may be a greater or less number for feeding the shot to each tooth; and these passages are not necessarily radial.

To receive the shot the inner ends of the feed passages have a circle of mouths 26 leading from the hub chamber 32, whose back wall is the face of the wheel body 10, and whose front wall is the frusto-conical flange 28. This chamber is an annular trough into which a fixed spout 30 may project for discharging shot by gravity from a suitable supply above.

The said shot are preferably small spheres having a diameter for example of one-sixteenth inch, and are made of chilled cast iron or some other suitable material which is both harder and less brittle than the stone which is to be cut. The supply of shot may be kept under water to prevent rusting, whence they may be raised by a conveyor (not shown) to be delivered wet through a funnel and spout 30 in a steady stream.

The incoming stream of shot is directed against a rotatable baffle plate 34 which absorbs much of the impact, and spreads the stream before permitting the shot to reach the radial feed passages. This baffle may be a disk on the inner end of a short shaft, which reaches into the chamber 32 from a suitable bearing 38 outside, tilted a little downward so that the lower edge of the baffle disk is close to the front wall of the chamber, while its upper edge is tipped back therefrom. The baffle is somewhat less in diameter than the diameter of the chamber; and thus there is space above it, and somewhat less space at each side of it, through which shot can be whirled from the front wall over to the back upper portion of the chamber to enter mouths of the said passages as the mouths pass that region.

The funnel spout 30 delivers shot into chamber 32 at one side of the shaft 36, with downward glancing impact of the shot on baffle plate 34, causing the latter to rotate. The chamber walls are rapidly rotating in the same direction, under the power which drives the wheel for doing its work in the kerf. The incoming wet shot, spread somewhat by the baffle over the rapidly rotating conical surface of the front chamber wall, are thereby whirled up and over the top of the baffle to enter the mouths 26 of the feed passages which are exposed at the top of their orbits. Such of these shot as miss the mouths fall into the trough 32 behind the baffle for entering feed passages elsewhere. Thus the compact stream of shot that may be arriving through the funnel spout 30 becomes distributed so that the shot do not press closely together at the entrance of any one passage so much as to interfere with their immediate entering, and thus the funnel stream is spread over several wheel mouths 26 and distributed among the parallel feed passages 22 of each.

Travel of those shot along the passages 22 to the teeth 12 requires more or less time, depending upon the speed of the wheel; and incidentally this stream of travel stretches out each stream of shot so that those arriving at the periphery from any single passage are spread over a substantial arc of the kerf. The major portion of the peripheral delivery at a tooth is desired to correspond with the working arc of that tooth in the kerf in the stone. The location of the arc of delivery relative to the work can be varied by adjusting the location of the arc where the shot begin their travel through the wheel, i. e. by adjusting the position of the baffle disk 34 so as to move the wide part of the opening between it and the conical wall, backward or forward along the circular orbit of the mouths 26. In the drawings, Figure 5, the disk is shown in a setting which provides the widest space between it and the conical wall, to be at the upper arc of a mouth's travel, with the space gradually decreasing thence in each direction to the bottom where the disk is close to the chamber wall. By shifting the location of this closeness, one may adjust the place where the greater bulk of shot will escape past this baffle into the mouths 26; and this shift may be made by resetting or shifting the bearing 38.

The location and extent of the shot delivery arc are affected also by the speed of rotation of the wheel, by the radial length of passages 22, and by the number of such passages which cooperate in a single group. All shot delivered into a mouth 26 are impelled by centrifugal force along the passages 22, even upward against gravity, and they travel as rapidly as the resultant forces impel them, except as they are retarded by the presence of other shot resulting in friction. Their travel is invariably along the lagging or rear race wall of each passage 22 which serves as a floor for their rolling or sliding; and it appears that they tend to move only in a layer of single thickness. A gulp of shot taken by a mouth 26 reaches the peripheral tooth more rapidly when it has a multiplicity of passages through which to move; and in that case its delivery becomes completely executed within a shorter arc of tooth travel. The length and position of delivery arc can be varied somewhat by changing the speed of the wheel, and by other variations taking account of the above mentioned characteristics, so that the arc of delivery can be made to correspond approximately with the working or cutting arc of the tooth to which each gulp of shot is delivered.

The teeth might be integral parts of the wheel body 10; but preferably they will be separable, for replacement, to make a renewal of a worn wheel without its complete reconstruction. The main part 10$^a$ of the wheel body, and its cover plate 10$^b$, which cooperate for making the passages 22, have a total thickness not greater than the thickness of a tooth 12, so that the body 10 can follow the tooth down into the kerf.

The back and front faces of teeth 12 have a special formation to coact with respect to the shot which are reaching the periphery, so as to control the incidence of each individual shot upon the work and tooth; and the peripheral face has a special cam formation to coact with the shot in effecting the cutting.

For getting the shot to their operating positions, between the peripheral face 12$^c$ of a tooth and the bottom of the fresh kerf in the granite block (see Figure 13) the invention provides for a special rate of supply and for an accuracy of placement so that they will become entrapped at the entrance throat (24$^b$, Figure 1 and Figure 1$^a$) as the leading edge of the tooth advances within the kerf, close to the granite. Strangely, I have found that the having of a single deep passage, such as the four passages 22 would become by eliminating the division walls between them, does not produce appreciably greater volume of delivery of shot than the having of a single shallow passage, despite the fact that abundance of shot were available for filling the hub end of the passage. I ascribe this to friction, having discovered that, with the shot lying several layers deep and pressed by inertia against their advancing rear wall or floor of the rotating passage, those shot which were under others could neither roll nor slide freely in the radial direction. Only the top layer would move freely; and the contents of the others would arrive at the periphery too late, after their tooth had passed out from the kerf. The pluralizing of these passages 22 involved individually reduced cross section, but permitted a plurality of streams of shot to proceed simultaneously to each tooth, and correspondingly increased the rate of delivery of shot to the space 24 between adjoining teeth. In Figure 1 these passages are represented as all terminating uniformly at the beginning of the space 24 between teeth, which constitute a sort of deflecting continuation of the passages 22 for feeding the shot to their operating positions at the peripheral faces of the teeth, so that four streams issue from the four several passages into one space 24; but I have found that these four separate streams can be combined successfully into one stream of shot, as shown in Figure 12, before the point of delivery into space 24 is reached, so that a stream of shot which is single-thick issues from that one of the passages 22 which is lagging behind the others in the rotation of the wheel. This is accomplished by terminating the floor of that passage, which is next most lagging, a little distance short of the end of the most lagging passage 22; and preferably by terminating the floor of each of the other passages 22 progressively nearer the intake hub. It appears that shot, which are close together where they start from the hub outward along these passages, become so spread apart by the acceleration of those which are ahead of others that there becomes room for a second layer to join the first in the plane of the first; and that likewise the third can join the second and with it join the first; and that the fourth stream of shot, rolling on the floor of its individual passage to the end of that which is the shortest of the floors, rolls off of that end and is picked up by the third floor, and rolls off the end of that and then off the end of the second, so that at the outmost end of the passages 22 the contents of all four passages are in a stream together on the rear wall or floor of the first passage. This concentration of quantity into a single-thick more rapid stream has certain advantages for the control of the shot on the remainder of their course to the throat 24$^b$.

If the course, on which the shot are moving when they arrive at the periphery of the wheel, were in radial direction (as, for example, if the radial passages 22 were to continue so as to end close to the peripheral face of the tooth, or if the space 24 were radial) the force with which any single shot would there strike the approximately stationary granite would be the momentum of that shot, and this momentum would be a force acting approximately in the direction of motion of that part of the rotating wheel. But this direction and velocity would be substantially the same as the direction and velocity of the adjacent tooth with which that shot was desired to cooperate. Moreover, all shot thus striking the granite with centrifugal violence would rebound therefrom, and the direction of rebound would be forward, away from the said tooth. Therefore, with such a construction, difficulty is experienced in getting the shot trapped between tooth and stone. The invention provides for utilizing the centrifugal momentum of the shot to make them fly relatively backward of the wheel's rotation into the small peripheral throat region 24$^b$ at the very peripheral end of the leading face 12$^a$ of a tooth. This is accomplished by making the rear face of the next forward tooth to be a reflector or at least a directing and guiding surface from which the shot react,—by angle of rebound, or by directed rolling or sliding on that surface, or by both means.

The disintegrating of granite to cut the kerf is done by the wheel's violent compressing of shot against the granite, at any place between its half round peripheral face and the granite block. Shot are seen concentrated there in single layer in Figure 13; and this is sufficient to cut a kerf of the full width illustrated, which, for example, may be taken to be ⅝ths inch wide, resulting from ½ inch thickness of tooth 12, and $\frac{1}{16}$th inch for diameter of shot at each end of the diameter of the half round edge thereof. Shot which escape from this half round face move idly out through the space (for example, the $\frac{1}{16}$th inch) which has thus been made between one side of the tooth 12 and the side of the kerf, until they escape from the kerf. The round shot in the kerf are at all times rolling forward on the granite, under frictional drive by the tooth, which theoretically progresses twice as fast as the shot. The compression of shot between granite and tooth is caused by the forward feed applied to the wheel shaft, or to the granite block W, by means not shown and by the cam face effect of each individual tooth. The cam effect, if not in the tooth as initially made, develops as the leading parts of the working face of the tooth become worn inward toward the axis faster than do the rear parts of the same face. In Figures 1$^a$ and 6$^a$ the cam represented as developed from wear at the entrance throat 24$^b$ is exaggerated.

To introduce the shot to their operative engagement between tooth-face 12$^c$ and granite, the line of the back or lagging edge of each tooth 12 inclines rearward from the mouth of its group of passages 22, the angle illustrated being 45°; and the surface of that edge face preferably is concave in cross section, one form for which is seen at groove 40, Figure 3. At the peripheral end of the groove 40 a terminal deflector 42 (Figure 1$^a$) prevents the shot from impinging directly on the adjacent stationary granite, and deflects them violently toward the throat region 24$^b$ (indicated by the small arrow in Figure 1$^a$) between the granite and the peripheral edge of the next succeeding tooth 12. When the stream of shot issuing from any group of passages 22 strikes the deflecting groove 40 thereof, each individual shot has momentum with a component in radial direction; and it tends either to rebound outward and backward of the wheel from that groove face, or, especially if constrained by contact with neighboring shot, tends merely to roll or slide outward along that groove face to the terminal deflector 42.

The teeth may be either pre-shaped or worn into their illustrated shape. If the wheel teeth are initially made square across on their peripheral faces, as seen in Figures 2 and 7, without the deflector, the V-grooves 40 may extend to the very peripheral edges of their respective teeth, because by attrition in use the peripheral faces of the teeth become worn into the half-round cross-sectional form of Figure 13. Metal at the peripheral edge, by its ductility, gradually becomes drawn peripherally to constitute the backward projection 42, which, although merely an appendage or "rag" edge on each tooth, yet serves as a terminal rearward deflector at the end of each V-groove 40, much like the form illustrated in Figure 1$^a$. In Figures 1 and 6 the wheel is represented with the V-grooves extending to the peripheries of the respective teeth, as would be the case with new flat faced teeth not yet worn by use. Figures 1$^a$ and 6$^a$ illustrate the ends of the grooves stopping just short of the periphery, because of the metal having drawn rearward into the pronounced shot-deflecting "rag". And Figure 13 illustrates the half-round peripheral contour developed by use. However, both the half-round peripheral edge of tooth, and the "rag" deflector 42, may be embodied by initial manufacture, in which case the throat of a peripheral face of tooth can be made a little larger than what is produced by wear alone.

Shot introduced at the hub chamber of the wheel become subject to complex forces in the course of their travel to the places of cutting coaction. Assuming a wheel of twenty to forty inches diameter to be turning with a surface speed having 3000 feet of travel per minute, the rotative speed will be several hundred revolutions per minute. Shot within the radial passages will be subject to centrifugal force; and each shot will hug the rear or lagging wall of its particular passage while rolling or slipping centrifugally outward along it. As the shot issue from the ends of passages 22, their outward momentum is so violent that they strike into groove 40 and, if this groove had a plane bottom, they either would be reflected thence toward the tooth next behind, or else if influenced more or less by congestion with other shot would travel along the groove. At the 45° angle stated, a speed of wheel can be found at which nearly all of the shot coming to the groove will continue in it until deflected sharply, backward of the rotation, by terminal deflector 42 or "rag" at the groove end. Some of the shot, rebounding from the groove before reaching the deflector 42, would strike the leading face 12ª of the next tooth 12, and it might be supposed that these would pass along to the peripheral throat outside of that tooth, where they could enter and cooperate. But because of their tendency to rebound forward on the granite, and because of the desire that they should not interfere with the free movement of shot sprayed into the throat from the end of groove 40, I prefer to make the bottom of the groove 40 of V-shape, to reduce the number which rebound against the tooth next to the rear; and I provide the bevels 44 on the leading edge 12ª of each such tooth next to the rear, to receive and reflect sidewise those shot which leave the V-groove too soon. Thus deflected to the side of the tooth, they harmlessly and more or less idly work along the space which has already been cut in the granite by the side of the tooth, and ultimately escape, without interfering with the arrangements for injecting shot to the throat at the semi-circular peripheral face of the tooth.

On the other hand, by suitable correlation of the rotative speed of wheel, the angle at which the rear face 12ᵇ of a tooth is made, with respect to the delivery end of passage 22, the shape of its groove, the width of space 24 between teeth, and the length of that same space 24, the spray of shot delivered by direct rebound from the groove 40 can be made to strike mostly at the entrance 24ᵇ of the peripheral throat outside of the next tooth 12, those missing it being but a small fraction of an inch away on either side. All are moving backward relative to the oncoming tooth, and therefore are possessed of the necessary impulse by which to enter the throat and co-operate with that tooth; and those which miss the precise entrance rebound or roll relatively toward it.

Either of these principles for guiding the stream of shot to the throat may be employed, or the teeth and passages may be built without knowing which will predominate, for the choice between them is rather a matter of refinement and the interference above suggested is a matter applying only to the higher ranges of efficiency and is not so serious as to affect the operativeness of the invention.

The shot in each passage 22 have orderly radial travel because, being in a single thick layer, they are maintained in progressive order throughout the extent of the passage. But individually their time of arrival at the periphery varies. Some too early, and some too late, to participate in the cutting, because not arriving while their tooth is in the kerf, fly out and are caught in a hood 46 which stands fixed around all of the wheel's periphery except in that region where the work W is or may be.

The hood proper ends at the level of the lowest point on the hub flange 28, this being the level of the deepest cut which the wheel may be called upon to execute, but adjustable hood extensions 46ª, 46ᵇ may be set down close to the granite block W when the cut is not to be so deep. Conveniently, the hood extensions may be mounted on a pair of guide bars 48, 48, one of which is carried on each side of the hood 46, and be adjustable along these bars, with means, such as set screws 50, 50 for securing the extensions at various levels.

The hood with its extensions constitutes a collecting trough which is open toward the periphery of the wheel which it houses. It receives shot which are discharged centrifugally too early or too late to take part in the normal cutting, and guides into action by external approach, such of them as come out, in a location whence gravity can move them to the place where the teeth 12 pass into the kerf. At this latter entrance to the kerf an adjustable deflector tip 52 is mounted on the hood extension 46ª, for concentrating the shot into a stream, and for directing that stream from the exterior to the place where the oncoming teeth are about to begin their work. Thus a continuous auxiliary supply of shot is maintained at the kerf entrance, where shot-wheel cutting is most difficult, from which supply a considerable number of shot will be engaged by the teeth in the cut, on principles already known. The other shot, arriving by the internal feed above described, would be sufficient alone to initiate the cut in a block, an operation so difficult that it has not hitherto been practicable with a shot wheel without special supplementary arrangement; but the two supplies may be used together with advantage.

The shot wheel assembly illustrated in Figures 1 and 2, and that of Figures 6 and 7, are adapted for cutting to any depth, limited only by the dimension of wheel outside of the hub flange 28. An apron 54 of canvas or the like may be hung from extension 46ᵇ to conserve shot which are carried out of the kerf as the respective teeth leave it.

In the modified structure of Figures 6-11, the wheel body with its radial feed passages may be the same as in the preferred form, but in this case the feed of shot into the radial passages is under the urge of compressed air, the shot issuing from a nozzle 56 into an annular hub opening 58 between inner and outer hub flanges 60, 62.

Radial partitions 64 divide the annular opening 58 into a multiplicity of mouths; and sloping walls 66, set within the hub and beyond each mouth, define for each a contracting throat which guides injected shot to a restricted area of the adjacent part of the main disk of the wheel, whence, at each mouth, a group of the parallel feed passages extends.

Shot from a supply source (not shown) are to be fed into the wheel in a constant stream by any suitable means. As represented in Figure 7, there is provided a gravity feed 68 (to which shot may be steadily supplied by a conveyor not shown) for delivering the shot into a hopper 70 which is a sort of injector, having an air inlet passage 72 in its rear wall for the blowing of compressed air across the floor of the hopper to propel shot thence out through the nozzle 56 in a forcible stream into the hub chamber. The shot thus entering, as the mouths move successively past the nozzle, go into the radial feed passages and by them are directed in radial streams through the wheel body to the spaces between the peripheral teeth 12',—to react there, and to be acted upon by the teeth, as herein explained for the first preferred form.

For the said propulsion of shot into the wheel, an inclined baffle plate 74 may form the compressed air blast into a thin jet close to the bottom of the hopper. The location of this nozzle feed of shot is at an upper portion of the circular cycle which the mouths traverse. The feed of shot from nozzle 56 into the wheel is continuous; but each mouth receives shot only at intervals, as it passes the nozzle 56. Then the travel of those shot to the periphery is as has been described. The location of the arc of delivery can be varied by adjusting the location of the nozzle backward or forward. In the drawings, Figure 6, the nozzle feeds each mouth at the top of its orbit, a little forward of the vertical center line of the wheel, for delivery to work fed horizontally under the wheel. For work fed vertically beside the wheel the location would be changed accordingly. The arc of delivery can be extended by making the nozzle 56 have a longer dimension in the direction in which the mouths are travelling, so that each will be receiving through a longer arc. Whatever shot are delivered into a mouth 67 are caught by centrifugal force, and by the conical form of the annular wall 62; so that by the same impelling force they enter the feed passages.

In the embodiment represented in these figures the teeth 12' are spaced further apart. One incident of this is greater space for the elastic bounding and re-bounding of shot between the back edge of one tooth and the leading edge of the next succeeding tooth, in reaching their positions for operating. The end of the V-groove in each tooth is here closed by a larger deflector, which forms a definite barrier to endwise discharge of shot from a V-groove, and which deflects the shot positively into the kerf in advance of and toward an on-coming tooth.

The principle of operation of both illustrated forms of the invention is the same.

In some styles of wheel the division line between "teeth", instead of being at the recess which receives shot for transmission to the peripheral face, as here shown, runs directly to the peripheral face. In applying the present specification to such cases it will be understood that the unit referred to as a tooth would be the section between spaces, regardless of the fact that the sectional division of the rim, for mounting and replacement purposes, comes in the midst of what is here called a tooth.

In operation of the wheel thus described attention is due particularly to the positive and uniform internal feed of shot to each tooth, while that particular tooth is in position to work on the stone. This gives assurance that all teeth will do equal shares in accomplishing a cut; that each tooth will work on all of the stone past which it travels; and that the abundance of supply of shot throughout its cutting cycle will be maintained in efficient coacting relation to the tooth and the stone. By making it possible to apply abundance of shot to the work, and to keep each tooth supplied to the very end of its travel through the kerf, the invention provides for rapid removal of stone from the path of the wheel in brittle-fractured particles which are individually so small that no very great expenditure of power is needed, as compared with prior practices in the cutting of stone of like character. The heat generation becomes a negligible quantity, and the temperature generated is so low that the moisture which clings to the wet shot is not evaporated beyond the stage where it is effective to keep these particles of stone from flying. The dust of detrition therefore does not pervade the atmosphere to the damage of the workmen; and because of the efficiency of the detriting action owing to the high speed at which it is practicable to drive the wheel and the violence with which the automatically placed shot crushes the granite surface, the total cost of operation is very favorable. It is also observed that the internal stresses which the operation sets up in the stone which is being cut are minor, as compared with cutting by other methods and apparatus, as is manifest from the fact that a kerf can be cut relatively close to an open surface of the stone without the thin layer of stone between the kerf and that open surface becoming broken.

These various features considerably enlarge the scope of work which can be done by machine with greater safety both to the work and to the worker than by hand.

It will be perceived that the present improvement involves fundamentally a new method for the cutting of stone by attrition. Throughout the length of the fresh kerf the detriting agent is supplied to the stone surface in the form of a spray. That is, each granule arrives at its initial working position by its own momentum. This deposits the detriting agent in a layer on the stone, in advance of each tooth, in position to become entrapped and to transmit detriting pressure to the stone, without reliance on the tooth to feed it thither. The granules stream into the kerf under independent control in a volume of supply which in a practical sense is inexhaustible. The supply stream is also a moving stream; its point of introduction to the kerf, as well as its point of application to the stone surface at the bottom of the kerf, moves along the kerf from beginning to end of the fresh part of the kerf. Hitherto, when granules have entered the kerf in a pocket in advance of an entering tooth, the leading part of that tooth may soon run bare. The small quantity of granules that can be grasped by rapidly entering teeth soon becomes exhausted, for each tooth is continuously and progressively outrunning the shot which are under it.

The apparatus part of the invention has been devised as one means of practicing this improvement in the art. In thus introducing a stream of shot the invention utilizes parts of the wheel that are not occupied in the detrition. The method of laying the shot in the kerf, without their introduction or feed by that tooth which is to work on them, is further developed in backward-momentum-of-shot idea, by which those shot proceed by their own momentum to their working positions. By momentum they move back into the advancing throat between tooth and stone, where they become entrapped by friction.

By the improvement, the rate of shot introduction to kerf is steady, and is separately controllable by regulating the rate at which shot are supplied to the wheel by the initial spout.

The feeding and distributing means illustrated can handle the shot at any chosen rate.

A still simpler embodiment of this part of the invention wherein shot introduced in batches, as from the buckets of a conveyor (not shown), are received by gravity through a spout, and are distributed among the passages 22 in streams which approach uniformity, is shown in Figures 14 and 15. The wheel 10 and the conical hub flange 28 there may be similar to those represented in Figures 1, 2 and 5, but all of the conical chamber within the hub flange, except a reversely conical central part thereof, is divided on radial lines by a series of radially disposed partitions 76, making a series of subchambers 78, open towards the axis, which shot enters from the spout 90 directed sidewise from the region of the axis. The radial passages 22 which are to be thus fed have their mouths arranged in groups, open as at 26 through the side of the wheel plate 10ᵇ just within the base of the conical hub flange 28, as in Figure 2. Figure 14 shows how that area of the wheelplate 10ᵇ which is within the circle of mouths 26 can be covered by a removable flat disk plate 80. The shot issuing from the spout 90 are discharged mainly against this plate, which may have been specially treated to have wear-resisting qualities. Shot received from the spout into the inward-open end of any sub-chamber 78 are immediately picked up by the radial rear wall of that chamber, which is driving forward with the wheel, and are thrown outward along that wall centrifugally to run off its peripheral edge near one of the groups of mouths 26. Meantime the shot, during this course from spout to wheel passages, undergo delays and distribution by unequal retardation due to the friction of passing along the walls of the sub-chamber, so that their time of arrival at the mouths is distributed. Their friction against each other contributes to this delay, and also their bounding and re-bounding from the plate 80 and the conical surface 28, as they are gradually concentrated by the converging of the cone 28 into the plane of the mouths 26.

At the axis, the inner edges of the dividing partitions 76 converge toward the axis at plate 80, making a space, which rotation of the wheel leaves open, in which the end of spout 90 can be set closely adjacent to the circular path of the inner edges of partitions 76, for delivering shot to the successive sub-chambers 78. Thence the shot travel outward, being carried around, on the faces of the respective partitions 76, each of which terminates peripherally slightly in advance of the leading one of the particular group of mouths 26 which is to be fed by that shot-carrying partition. A useful feature is that, between the outer ends of the partitions 76 and the circle of mouths 26, a short annular space 84 may intervene, across which the shot fly to that part of the conical hub flange 28 which overlies this annular space 84 at a little distance. This deflects the shot flying free from the end of each radial partition 76, introduces delay for some, and assists in the attainment of a spray effect over the whole group of mouths 26.

The position of spout 90 illustrated in Figure 15 illustrates for the wheel which is being there illustrated, the position which was found correct for the shot to arrive at a kerf (not illustrated in that figure) below and to the right of the axis of that figure.

I claim as my invention:

1. Apparatus for cutting stone and the like brittle hard materials, comprising a pressing blade having tough hard teeth adapted to run in a kerf in the stone for compressive coaction with a loose granular hard detriting agent; there being, in the blade, enclosed passages adapted to feed dry loose shot as said agent, having inlet openings for said agent in a part of the blade outside of that part which runs in the kerf, and having openings for discharge of said agent from their said enclosure within the blade to operating positions at the pressing faces of the teeth; the said passages severally having directions adapted to facilitate acceleration of shot passing through them; the fluid therein around the shot being predominantly gaseous, so that the shot can rebound freely; and there being a baffle at the discharge opening of each passage, set on the leading face of that passage at an angle, crossing the path of shot which are out-flying from the lagging face of the passage, the said angle being one directing out-flying shot by rebound obliquely toward the peripheral end of the lagging face of the passage.

2. Apparatus for cutting stone and the like brittle hard materials, comprising a rotary blade having tough hard peripheral teeth adapted to run in a kerf in the stone for compressive coaction with dry loose shot; said wheel having enclosed passages, adapted to feed said shot, extending interiorly of the blade toward its periphery, having inlet openings in the side of the blade near its axis; shot feeding means discharging shot into the inlets at a little distance from the axis and not at the axis; said passages having discharge openings at the periphery, in advance of the peripheral pressing faces of the teeth; the fluid around the shot in said passages being predominantly gaseous, so that the shot can rebound freely; and there being a baffle at the discharge opening of each passage, set on the leading face of that passage at an angle, crossing the path of shot which are outflying from the lagging face of the passage, the said angle being one directing outflying shot by rebound obliquely toward the peripheral end of the lagging face of the passage.

3. Apparatus of the class described comprising a pressing wheel having teeth adapted to run in a kerf in the stone; said wheel having passages for guiding a detriting agent such as dry shot toward the teeth; inlet means for the agent to those passages at a location near, but not at the axis, being also at a distance toward the hub from the periphery, whereby in traversing the passages the agent acquires centrifugal momentum; there being a precipice in the lagging wall of the passage off which shot running on that wall fly into air in the midst of the passage; and a baffle wall in the peripheral region set at an angle to the course of the agent for directing the said momentum on a course which is backward, as regards the local motion of the wheel, and is toward a peripheral face of tooth next to the rear.

4. Apparatus for cutting stone and the like brittle hard materials, comprising a pressing wheel having tough, hard teeth adapted to run in a kerf in a stone, for compressive coaction with a loose, granular hard detriting agent; discharge spaces for the agent distributed around the periphery; inlet mouths distributed around the hub, one for each discharge space; and a group of parallel passages for the agent from each single mouth to its single discharge space, the passages of each group being located in succession in the direction of rotation, and thereby providing a plurality of streams of shot within the total feeding space allotted for each single discharge space, each of said streams being of the full width of the passage space, and a deflector set in the path of granules centrifugally approaching the periphery, directing them backward with respect to the local motion of the wheel, for coaction with the peripheral face of tooth which is following.

5. A wheel for cutting stone and the like brittle hard materials, in compressive coaction with a loose hard granular detriting agent; said wheel having a body around whose periphery are teeth, and spaces open across the full thickness of the wheel at the periphery and running inward from the periphery; and in whose body are passages leading to said spaces, adapted for the feeding of dry loose shot as said agent to the teeth; the fluid around the granules in the passages and spaces being predominantly gaseous, and the lagging walls of the passages, on which the granules run, being shaped to throw those granules across the passages and into the said spaces, and against the leading walls of those spaces, and the leading face of each said space being positioned and inclined, relative to the position and direction of discharge of the passage serving it, so that granules issuing from the passage impinge upon it and are thereby deflected toward the peripheral portion of the rear wall of said space.

6. In apparatus of the class described and in combination with a wheel having peripheral teeth, and passages centrifugally feeding a loose granular detriting agent to peripheral spaces for coaction with those teeth when in the kerf, a collecting hood arranged around the upper part of the wheel's periphery and extending down to near the place of entrance of the wheel into the kerf, said hood being a barrier and a guide, arranged to arrest such of said agent as is thrown free of the wheel at upper regions, and an apron at the lower end of the hood, approaching closely the periphery of the wheel and receiving said agent from the hood and constituting a terminal directing device to guide arrested granules to said place of entrance of wheel into the kerf.

7. Apparatus for cutting stone and the like brittle hard materials, comprising a pressing wheel having tough, hard teeth adapted to run in a kerf in a stone, for compressive coaction with a loose, granular hard detriting agent; discharge spaces for the agent distributed around the periphery; passages thereto from the region of the hub; inlet mouths to the passages, distributed around the hub, at least one for each discharge space; centrifugal feeders for the mouths, having radial surfaces along which granules of the detriting agent are moved; and, beyond the ends of the radial surfaces, a deflector having a conical surface, receiving the centrifugal flight of granules and deflecting the granules in a spray toward the inlet mouths.

JOHN G. TULLGREN.